United States Patent
Park

(10) Patent No.: US 11,065,662 B2
(45) Date of Patent: Jul. 20, 2021

(54) PRESS FORMING METHOD FOR COMPOUND MATERIAL

(71) Applicant: OHSUNG DISPLAY CO., LTD., Busan (KR)

(72) Inventor: Hae Chan Park, Yangju-si (KR)

(73) Assignee: OHSUNG DISPLAY CO, LTD., Busan (KR)

( * ) Notice: Subject to any disclaimer, the term of this patent is extended or adjusted under 35 U.S.C. 154(b) by 367 days.

(21) Appl. No.: 15/927,522

(22) Filed: Mar. 21, 2018

(65) Prior Publication Data

US 2019/0291158 A1 Sep. 26, 2019

(51) Int. Cl.

| | |
|---|---|
| *B21D 19/12* | (2006.01) |
| *B26D 1/14* | (2006.01) |
| *B32B 15/08* | (2006.01) |
| *B32B 15/18* | (2006.01) |
| *B32B 3/04* | (2006.01) |
| *B32B 15/20* | (2006.01) |

(Continued)

(52) U.S. Cl.
CPC ............ *B21D 19/12* (2013.01); *B26D 1/14* (2013.01); *B32B 3/04* (2013.01); *B32B 15/08* (2013.01); *B32B 15/18* (2013.01); *B32B 15/20* (2013.01); *B32B 2457/206* (2013.01); *H01L 51/5243* (2013.01); *H01L 51/56* (2013.01)

(58) Field of Classification Search
CPC .... B21D 19/12; B21D 35/007; B21D 35/005; B21D 47/04; B21D 5/16; B21D 11/08; B21D 39/02; B21D 39/021; B21D 39/00; B21D 39/035; B21D 19/043; B21D 51/2615; B21D 51/2623; B29C 53/063; B32B 2457/206; B32B 3/04; B32B 3/02; B27G 13/14; B26D 1/14; B26D 3/06
See application file for complete search history.

(56) References Cited

U.S. PATENT DOCUMENTS

| | | | |
|---|---|---|---|
| RE45,479 E | * 4/2015 | Jones ..................... | B65H 3/02 220/592.15 |
| 2001/0032848 A1 | 10/2001 | Jones et al. | |

(Continued)

FOREIGN PATENT DOCUMENTS

| | | |
|---|---|---|
| JP | 10277827 A * | 10/1998 |
| KR | 10-2014-0094694 A | 7/2014 |
| KR | 10-2016-0019751 A | 2/2016 |

OTHER PUBLICATIONS

Machine Translation of JP-10277827-A, Tomoaki et al., Publication Year 1998, Total pp. 10 (Year: 2020).*

*Primary Examiner* — Teresa M Ekiert
*Assistant Examiner* — Sarkis A Aktavoukian
(74) *Attorney, Agent, or Firm* — Novick, Kim & Lee, PLLC; Jae Youn Kim

(57) ABSTRACT

Provided is a press forming method for a composite material, which prevents a longitudinal section of the composite material from being exposed to outside. To this end, the method includes: cutting edges of the upper metal layer and the resin layer using a cutter such that the resin layer is cut relatively more than the upper metal layer; bending the upper metal layer toward the lower metal layer; and folding the lower metal layer by an angle of 180 degrees using a hemming die such that side surfaces of the upper metal layer and the resin layer are prevented from being exposed to outside.

10 Claims, 5 Drawing Sheets

(51) Int. Cl.
   *H01L 51/52*   (2006.01)
   *H01L 51/56*   (2006.01)

(56) References Cited

U.S. PATENT DOCUMENTS

| | | | |
|---|---|---|---|
| 2004/0163771 A1* | 8/2004 | Herring, Jr. | B21D 39/021 |
| | | | 156/575 |
| 2009/0229335 A1* | 9/2009 | Carsley | B23K 26/359 |
| | | | 72/306 |
| 2013/0074314 A1* | 3/2013 | Yokogawa | B21D 39/021 |
| | | | 29/469.5 |
| 2015/0068021 A1* | 3/2015 | Cui | B21D 39/02 |
| | | | 29/505 |
| 2017/0225428 A1* | 8/2017 | Muir | B32B 5/18 |

* cited by examiner

PRESS FORMING METHOD FOR COMPOUND MATERIAL

BACKGROUND OF THE INVENTION

Field of the Invention

The present invention relates to a press forming method for a composite material, which prevents a longitudinal section of the composite material from being exposed to outside.

Description of the Related Art

In general, an OLED display is a self-luminous display in which each self-luminous pixel can illumine independently, thus requiring no backlight unit. The OLED display is constructed using an encap (encapsulation film), an OLED, a color refiner on TFT (CRT), glass, and an anti-reflection film (ARF).

A typical OLED is composed of two electrodes and an organic layer. When electric power is applied, holes and electrons are injected from the electrodes are injected into the organic layer, and they recombine in the organic layer to form an exciton. The exciton transitions from an excited state to a ground state, leading to emission of light. When oxygen and/or moisture permeates into the OLED, shortening of lifespan and lowering of luminous efficiency are caused. Thus, manufacturing of the OLED display includes an encapsulation process in which an encapsulation structure is formed to encapsulate an OLED panel having an OLED in order to prevent penetration of oxygen and/or moisture.

FIG. 1 is a view showing a typical display structure. As shown in FIG. 1, the display includes a backboard, a cabinet, a pad, and a panel. The bonding of the backboard and the cabinet constituting the display is carried out using a double-sided tape as shown in FIG. 1. In other words, the double-sided tape is placed between the backboard and the cabinet to bond the cabinet to the backboard together.

In other words, a separate cabinet (middle cabinet: M/C) is required in order to prevent side surfaces of the backboard and the pad from being exposed to outside, leading to an increase in manufacturing cost, and a requirement of a separate process.

The foregoing is intended merely to aid in the understanding of the background of the present invention, and is not intended to mean that the present invention falls within the purview of the related art that is already known to those skilled in the art.

Documents of Related Art (Patent document 1) Korean Patent Application Publication No. 10-2016-0019751

(Patent document 2) Korean Patent Application Publication No. 10-2014-0094694

SUMMARY OF THE INVENTION

Accordingly, the present invention has been made keeping in mind the above problems occurring in the related art, and an object of the present invention is to propose a method of preventing the side surface of a pad from being exposed to outside without provision of a separate member.

Another object to be solved by the present invention is to propose processes for providing excellent flatness and stiffness and providing easy finishing of the side surface.

A further object of the present invention is to propose a display capable of reducing manufacturing cost.

In order to achieve the above object, according to one aspect of the present invention, there is provided a press forming method for a composite material including an upper metal layer, a resin layer, and a lower metal layer, the method including: cutting edges of the upper metal layer and the resin layer using a cutter such that the resin layer is cut relatively more than the upper metal layer; bending the upper metal layer toward the lower metal layer; and folding the lower metal layer by an angle of 180 degrees using a hemming die such that side surfaces of the upper metal layer and the resin layer are prevented from being exposed to outside.

According to the method of press forming the composite material according to the present invention, the metal layer located at the relatively lowest position is folded by an angle of 180 degrees using a hemming die (jig) such that a cut surface of the composite material is prevented from being exposed to outside. Thus, the metal layer is folded by an angle of 180 degrees using the hemming die such that the cut surface of the composite material is prevented from being exposed to outside, thereby eliminating a requirement to use a separate middle cabinet.

As described above, since the separate middle cabinet is not used, manufacturing cost is reduced, and a finished appearance is also excellent.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The above and other objects, features and advantages of the present invention will be more clearly understood from the following detailed description when taken in conjunction with the accompanying drawings. Hereinbelow, exemplary embodiments of the present invention will be described in detail with reference to the accompanying drawings such that the invention can be easily embodied by one of ordinary skill in the art to which this invention belongs.

Figure 1:
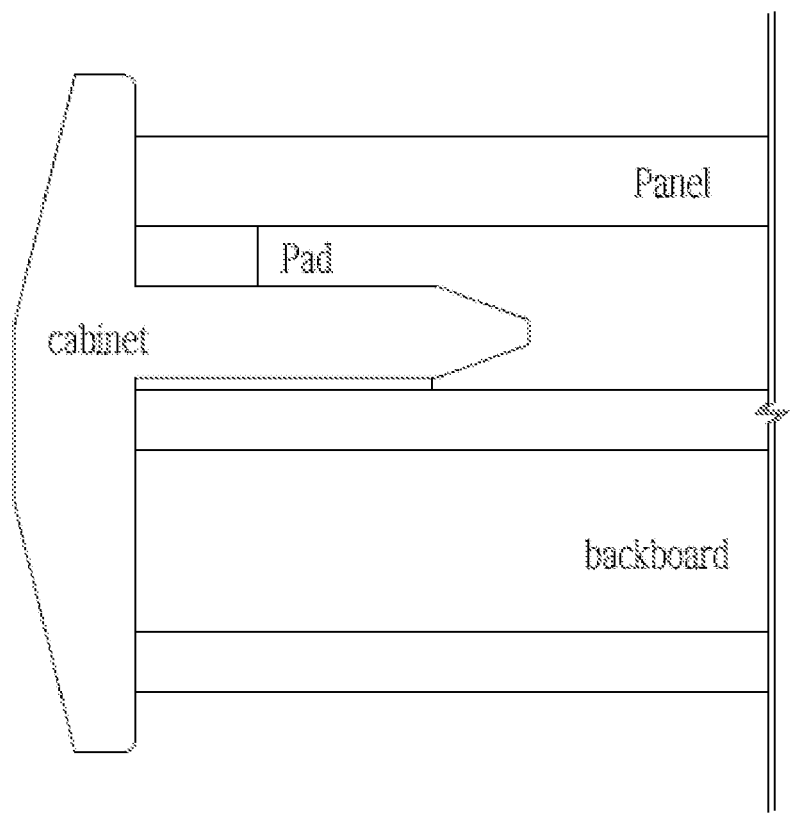
FIG. 1 is a view showing a typical display structure.
Figure 2:
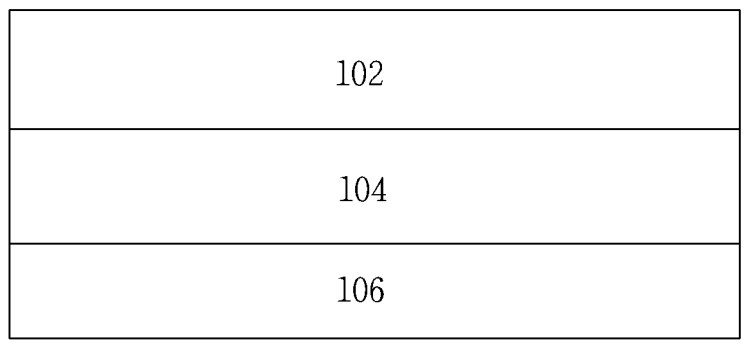
FIG. 2 is a view showing a structure of a composite material according to an embodiment of the present invention.

FIG. 2 is a view showing a composite material according to an embodiment of the present invention. Hereinafter, the composite material according to the embodiment of the present invention will be described in detail with reference to FIG. 2.

As shown in FIG. 2, a composite material 100 includes an upper metal layer 102, a resin layer 104, and a lower metal layer 106. Further, as shown in FIG. 2, longitudinal sections (cut surfaces) of respective materials constituting the composite material form one flat surface.

Figure 3:
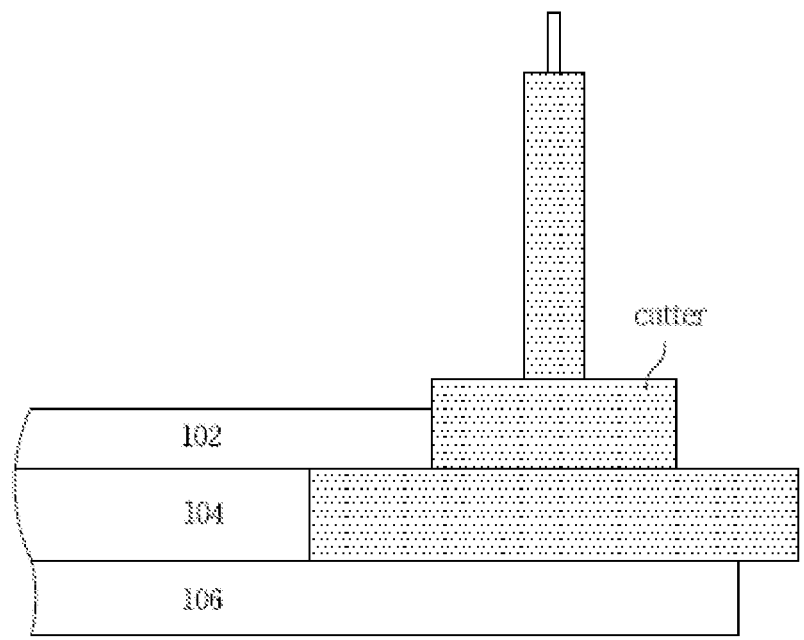
FIG. 3 is a view showing a forming process for the composite material according to an embodiment of the present invention.

FIG. 3 is a view showing a forming process for the composite material according to an embodiment of the present invention. Hereinafter, the method of forming the composite material according to the embodiment of the present invention will be described in detail with reference to FIG. 3.

As described above, a longitudinal section (cut surface) of the composite material 100 forms one flat surface. In this state, the longitudinal section (edge) of the composite material is formed using a cutter. As shown in FIG. 3, the cutter is a 'T-cutter', and the upper metal layer 102 and the resin layer 104 are cut using the cutter. In this case, the resin layer 104 is relatively more cut than the upper metal layer 102. In other words, the resin layer 104 is cut using a portion of the cutter, which has a relatively large diameter, while the upper metal layer 102 is cut using a portion of the cutter, which has a relatively small diameter. The upper metal layer 102 and the resin layer 104 of the composite material are cut using the cutter as shown in FIG. 3.

Figure 4:
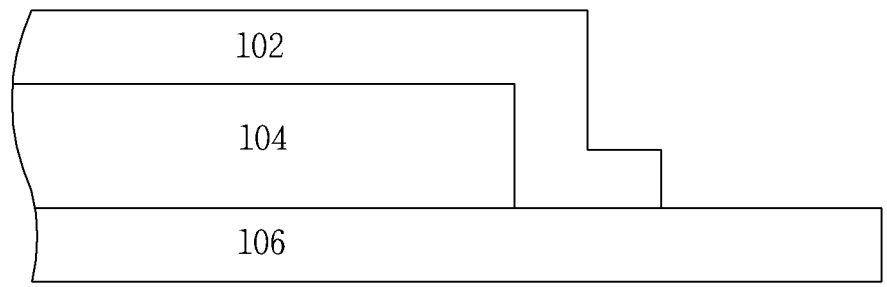
FIG. 4 is a view showing a forming process for the composite material according to the embodiment of the present invention after cutting an upper metal layer and a resin layer.

FIG. 4 is a view showing a forming process for the composite material according to the embodiment of the present invention after cutting the upper metal layer and the resin layer. Hereinafter, the method of forming the composite material according to the embodiment of the present invention after cutting the upper metal layer and the resin layer will be described with reference to FIG. 4.

As shown in FIG. 4, the upper metal layer 102, which protrudes relatively more than the resin layer 104, is bent toward the lower metal layer 106. As the upper metal layer 102 is bent toward the lower metal layer 106, the longitudinal section of the resin layer 104 is brought into close contact with the upper metal layer 102. FIG. 4 shows a state in which the upper metal layer 102 is in fully close contact with the longitudinal surface of the resin layer 104. In particular, the bent upper metal layer 102 is in close contact with an upper surface of the lower metal layer 106. In other words, the upper metal layer 102 has two bent portions. Of course, depending on the protruding length of the upper metal layer 102, the upper metal layer 102 may have one bent portion.

Figure 5:
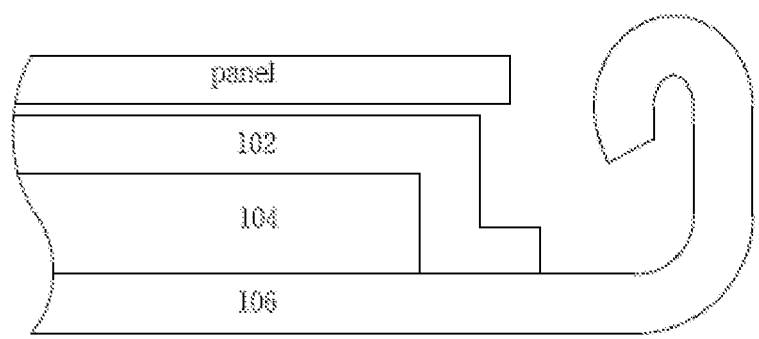
FIG. 5 is a view showing a forming process for the composite material according to the embodiment of the present invention after folding the upper metal layer.

FIG. 5 is a view showing a forming process for the composite material according to the embodiment of the present invention after bending the upper metal layer. Hereinafter, the method of forming the composite material according to the embodiment of the present invention will be described in detail with reference to FIG. 5.

As shown in FIG. 5, after bending the upper metal layer 102, the lower metal layer 106 is folded by an angle of 180 degrees using a hemming die. By thus folding the lower metal layer 106 by an angle of 180 degrees using the hemming die, the longitudinal section of the composite material is prevented from being exposed to outside.

As described above, the lower metal layer 106 is folded by an angle of 180 degrees using the hemming die, whereby it is not necessary to perform a process of preventing the edge of the resin layer 104 from being exposed to outside by using a separate member (middle cabinet: M/C) such that the edge (longitudinal section) of the composite material is prevented from being exposed to outside.

Figure 6:
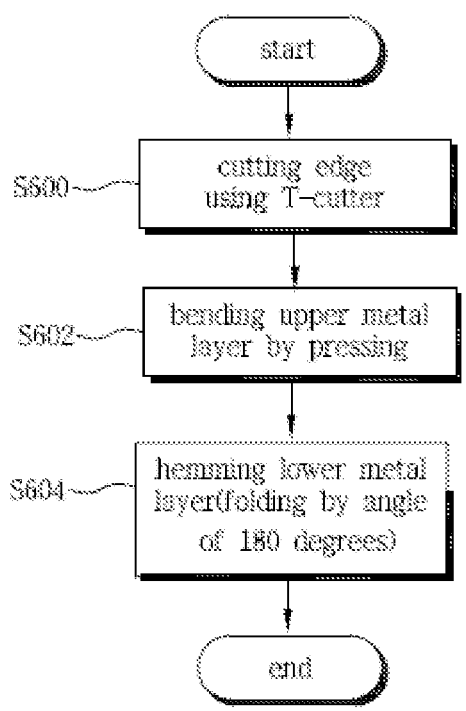
FIG. 6 is a flowchart showing the forming processes for the composite material according to the embodiment of the present invention.

FIG. 6 is a flowchart showing the forming processes for the composite material according to the embodiment of the present invention. Hereinafter, the method of forming the composite material according to the embodiment of the present invention will be described in detail with reference to FIG. 6.

In step S600, the composite material composed of the upper metal layer 102, the resin layer 104, and the lower metal layer 106 is cut using a 'T-cutter' such that the edges of the upper metal layer 102 and the resin layer 104 are cut. In this case, the resin layer 104 is relatively more cut than the upper metal layer 102.

In step S602, the upper metal layer 102, which is relatively less cut than the resin layer 104, is bent toward the lower metal layer 106. In this case, the upper metal layer 102 may have one or two bent portions depending on the protruding length thereof from the resin layer 104 and the thickness of the resin layer 104.

In step S604, the lower metal layer 106 is folded by an angle of 180 degrees using the hemming die to prevent the edge of the composite material from being exposed to outside.

As described above, according to the present invention, the lower metal layer 106 is folded by an angle of 180 degrees using the hemming die, whereby the edge of the resin layer 104 is prevented from being exposed to outside without provision of a separate member.

Figure 7:
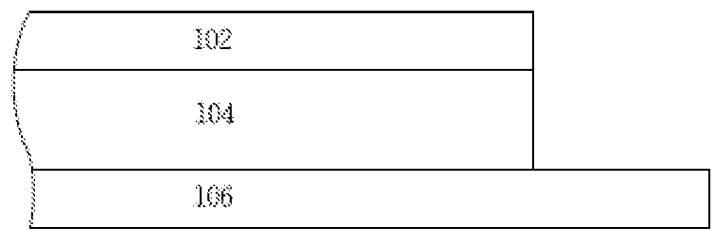
FIG. 7 is a view showing a forming method for a composite material according to another embodiment of the present invention.
Figure 7:
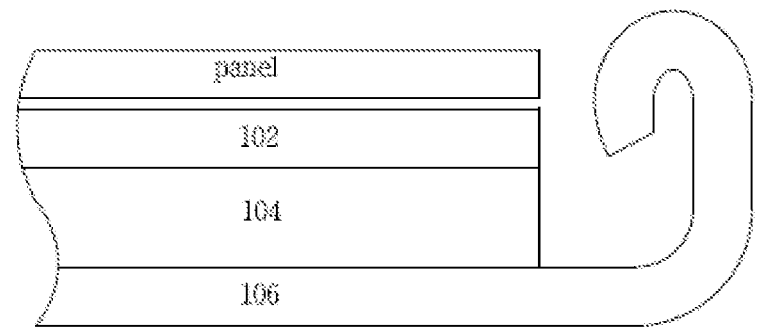

FIG. 7 is a view showing a forming method for a composite material according to another embodiment of the present invention. As shown in FIG. 7, the composite material includes an upper metal layer 102, a resin layer 104, and a lower metal layer 106. In FIG. 3, the upper metal layer 102 and the resin layer 104 are cut using a cutter in which the resin layer 104 is relatively more cut than the upper metal layer 102. On the other hand, in FIG. 7, the upper metal layer 102 and the resin layer 104 are cut equally, and the bending of the upper metal layer 102 is not performed. However, in FIG. 7, the bending of the lower metal layer 106 by an angle of 180 degrees using the hemming die is performed in the same manner. Thus, in FIG. 7, the edge (cut surface, longitudinal section) of the upper metal layer 102 and the edge (cut surface, longitudinal section) of the resin layer 104 are also prevented from being exposed to outside by the lower metal layer 106, whereby it is not necessary to perform a process of preventing the longitudinal section of the composite material from being exposed to outside using a separate member.

In the present invention, a composite material composed of an upper metal layer, a resin layer, and a lower metal layer is mentioned, but is not limited thereto. The present invention can be applied to various types of composite materials such as a composite material made of stainless steel (STS)-aluminum-stainless steel (STS), a composite material made of aluminum-steel plate cold commercial (SPCC)-aluminum, etc. In other words, the present invention can be applied to various materials such that the longitudinal section of a composite material having a laminated structure is prevented from being exposed to outside. In this case, the above-mentioned effect can be obtained by folding a material located at the lowest position by an angle of 180 degrees using the hemming die.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A press forming method for a composite material including an upper metal layer, a resin layer, and a lower metal layer having an end point, a folded point and a bent point, the method comprising:
   cutting edges of the upper metal layer and the resin layer using a cutter such that the resin layer is cut relatively more than the upper metal layer;
   bending the upper metal layer toward the lower metal layer; and
   folding the lower metal layer at the folded point by an angle of 180 degrees using a hemming die to form a folded portion; and
   bending upwardly the lower metal layer at the bent point having a first distance between the bent point and the folded point and a second distance between the bent point and the end point to form a bent portion, wherein a side surface of the upper metal layer is shielded by the lower metal layer, the first distance being longer than the second distance,
   wherein a height defined from the bent point of the bent portion to the folded point of the folded portion of the lower metal layer is greater than a combined thickness of the upper metal layer and the resin layer.

2. The method of claim 1, wherein in the bending of the upper metal layer toward the lower metal layer, the upper metal layer has at least one bent portion depending on one of a protruding length from an end of the resin layer to an end of the upper metal layer and a thickness of the resin layer.

3. The method of claim 2, wherein the cutter is a 'T-cutter', and the 'T-cutter' has a cutting wheel having different diameters.

4. A composite material formed by the method of claim 1, wherein a height defined from the bent point of the bent portion to the folded point of the folded portion of the lower metal layer is greater than a combined thickness of the upper metal layer and the resin layer, and wherein the side surfaces of the upper metal layer and the resin layer are vertically disposed.

5. The composite material of claim 4, wherein the upper metal layer contacts the lower metal layer.

6. The method of claim 1, wherein the side surfaces of the upper metal layer and the resin layer are vertically disposed.

7. The method of claim 1, wherein the upper metal layer contacts the lower metal layer.

8. A press forming method for a composite material including an upper metal layer, a resin layer, and a lower metal layer having an end point, a folded point and a bent point, the method comprising:
   cutting edges of the upper metal layer and the resin layer using a cutter;
   folding the lower metal layer at the folded point by an angle of 180 degrees using a hemming die to form a folded portion; and
   bending upwardly the lower metal layer at the bent point having a first distance between the bent point and the folded point and a second distance between the bent point and the end point to form a bent portion, wherein a side surface of the upper metal layer is shielded by the lower metal layer, the first distance being longer than the second distance,
   wherein a height defined from the bent point of the bent portion to the folded point of the folded portion of the lower metal layer is greater than a combined thickness of the upper metal layer and the resin layer.

9. A composite material formed by the method of claim 8, wherein a height defined from the bent point of the bent portion to the folded point of the folded portion of the lower metal layer is greater than a combined thickness of the upper metal layer and the resin layer, and wherein the side surfaces of the upper metal layer and the resin layer are vertically disposed.

10. The method of claim 8, wherein the side surfaces of the upper metal layer and the resin layer are vertically disposed.

* * * * *